United States Patent
Tani

(10) Patent No.: US 6,889,306 B1
(45) Date of Patent: May 3, 2005

(54) MICROPROCESSOR AND PROGRAM MODIFICATION METHOD IN THE MICROPROCESSOR

(75) Inventor: Takenobu Tani, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 617 days.

(21) Appl. No.: 09/697,429

(22) Filed: Oct. 27, 2000

(30) Foreign Application Priority Data

Oct. 29, 1999 (JP) .......................................... 11-308140

(51) Int. Cl.⁷ .............................................. G06F 12/00
(52) U.S. Cl. ........................... 711/202; 711/103; 713/1
(58) Field of Search .................................. 711/202, 102, 711/103, 208, 220, 3; 713/1, 2, 100; 717/168, 169, 122; 365/236, 230.02; 712/203, 223, 205, 229, 230, 235, 245, 37

(56) References Cited

U.S. PATENT DOCUMENTS

| | | | | |
|---|---|---|---|---|
| 5,274,815 A | * | 12/1993 | Trissel et al. | 712/226 |
| 5,408,672 A | | 4/1995 | Miyazawa et al. | |
| 5,790,860 A | * | 8/1998 | Wetmore et al. | 717/122 |
| 5,835,963 A | * | 11/1998 | Yoshioka et al. | 711/207 |
| 6,078,548 A | * | 6/2000 | Jih | 365/236 |
| 6,253,281 B1 | * | 6/2001 | Hall | 711/112 |
| 6,308,265 B1 | * | 10/2001 | Miller | 713/2 |
| 6,588,010 B1 | * | 7/2003 | Ogata | 717/169 |
| 2002/0062479 A1 | * | 5/2002 | Takata | 717/168 |

FOREIGN PATENT DOCUMENTS

| | | |
|---|---|---|
| JP | 02-201648 | 9/1990 |
| JP | 05-233266 | 9/1993 |
| JP | 09-160768 | 6/1997 |
| JP | 10-207704 | 8/1998 |

OTHER PUBLICATIONS

"Dual Indirect RAM/ROM Jumptable for Firmware Update", IBM Technical Disclosure Bulletin, vol. 31, No. 1, Jun. 1988, pp. 294–298.*

* cited by examiner

*Primary Examiner*—Pierre Bataille
(74) *Attorney, Agent, or Firm*—McDermott Will & Emery LLP

(57) ABSTRACT

The microprocessor is provided with a program modification function not attended with unnecessary branch instructions or interrupt processes. The instruction storage unit includes read-only-memory (ROM) for storing instructions composing a program to be processed and a modified instruction storage unit for storing modified instructions for program modification. When the upper bits of an instruction address supplied from the program counter match with the upper bits of the modifying address, the address translation unit translates the upper bits of the instruction address into the upper bits of the substitutive address where the modified instruction is stored in the modified instruction storage unit.

2 Claims, 11 Drawing Sheets

Fig. 9

| input address | output address |
|---|---|
| 00 | 00 |
| 01 | 01 |
| ⋮ | ⋮ |
| 47 | C0 |
| ⋮ | ⋮ | control signal to each block

MICROPROCESSOR AND PROGRAM MODIFICATION METHOD IN THE MICROPROCESSOR

BACKGROUND OF THE INVENTION

The present invention belongs to a technique related with a program modification feature in a microprocessor.

A microprocessor receives instructions composing a program from a storage device, and decodes the instructions with the decoder to control its constituent device such as a calculation device, an input device, an output device, a storage device, or a control device depending on the contents of the instructions, thereby to proceed processes in sequence. The microprocessor which is referred to in this specification includes a microcomputer, a micro controller and a digital signal processor.

FIG. 11 is a diagram showing the rough structure of a general microprocessor. As shown in the diagram, the program counter 10 supplies an instruction storage unit 100 composed of a ready-only-member (ROM) 101, or random-access-memory (RAM), with the address of an instruction to be executed next. The instruction storage unit 100 outputs instruction data in accordance with the received address to a decoder 40. Through these operations, the processes are executed in sequence.

Assume that the program stored in the ROM 101 composing the instruction storage unit 100 contains a bug or a modification of specification. In this case, it is impossible to modify the contents of the program stored in the ROM 101 after the fabrication of the microprocessor, so that the program modification requires the make-over of the microprocessor with a new ROM. This undesirably boosts the cost of manufacturing and delays the delivery of the product.

In order to eliminate the need for the make-over, conventional microprocessors have a program modification feature that enables the program to be modified even after the fabrication of the microprocessors.

FIG. 12 shows the structure of a microprocessor with a conventional program modification feature. In the structure, the program counter 10 supplies the instruction storage unit 100 with an instruction address via an instruction address bus. The instruction storage unit 100 includes the ROM 101 which has programs stored. In the instruction modification unit 110, a modifying address storage unit 111 holds the address value to be modified, and a substitutive instruction storage unit 112 holds the substitutive instruction data to be substituted for an instruction with a bug. An address comparator 113 compares the address value held in the modifying address storage unit 111 with the address value outputted from the program counter 10 every machine cycle and supplies an instruction selector 114 with an address match signal indicating whether or not these values match with each other. The instruction selector 114 selects the substitutive instruction data stored in the substitutive instruction storage unit 112 when the address match signal indicates the match between the address values, and selects the instruction data stored in the instruction storage unit 100 when the signal indicates the mismatch between the address values so as to output the instruction data to the decoder 40.

As described hereinbefore, the conventional program modification feature is achieved as follows: a modifying address which is the address of an instruction to be modified and a substitutive instruction are held in a pair, and when the instruction address outputted from the program counter 10 matches with the modifying address, the instruction data of the instruction address is substituted by the substitutive instruction data and supplied to the decoder 40.

Problems to be Solved

However, the conventional structure shown in FIG. 12 has the following problems.

As a first problem, in this structure one instruction can basically substitute for one instruction only. In order to substitute for more than one instruction, it is necessary to provide more than one instruction modification unit 110 or to operate the unit 110 more than one time. The former leads to an increase in the circuit size, whereas the latter requires branch instructions or interrupt processes with useless machine cycles for the execution process of the inherently needless instructions. What is worse, the number of interrupts that the user can use is decreased by the use of the interrupt processes.

An increase in the branch instructions or in the interrupt processes has been a serious problem at the product level in recent years. For example, when an instruction with a bug is in a deep site of the repetitive loop, even if the added steps are several in one execution, tens or hundreds times as many as the steps are actually to be spent in vain. This problem becomes particularly serious in digital signal processors because they usually have a multiplexed repetitive loop due to the nature of their calculation process. Furthermore, in products used in real time, even a several-step increase has a great influence.

As another problem, program modification attended with an increase in the number of instructions requires the provision of a storage unit for additional instructions aside from the substitutive instruction storage unit 112. This undesirably increases the circuit size.

SUMMARY OF THE INVENTION

An object of the present invention is in a microprocessor to realize a program modification function not attended with unnecessary branch instructions or interrupt processes. Another object is in a microprocessor to realize a program modification feature attended with an increase in the number of instructions by a simple structure.

To be more specific, the present invention is a microprocessor provided with a program modification function comprising: an instruction storage unit including a ROM for storing instructions composing a program to be processed and a modified instruction storage unit for storing a modified instruction for program modification; and an address translation unit for receiving an instruction address of an instruction stored in said ROM and for translating the instruction address into a substitutive address at which the modified instruction is stored in said modified instruction storage unit when the instruction address matches with a modifying address which is an address of an instruction to be modified, said address translation unit outputting the substitutive address to said instruction storage unit instead of the instruction address.

According to the present invention, an instruction to be modified can be substituted by a modified instruction stored in the modified instruction storage unit by translating the address to be supplied to the instruction storage unit. Consequently, program modification can be achieved without the execution of unnecessary branch instructions or interrupt processes. Furthermore, contiguous address areas can be modified, so that program modification can be performed not only in units of one word but also in units of a block consisting of several words.

The address translation unit is preferably so composed that the bit width to be the translation target is changeable when the instruction address is translated into the substitutive address.

The address translation unit is preferably composed of a memory which outputs translated addresses in accordance with the received instruction addresses. Alternatively, the address translation unit is preferably composed of a field programmable logic which outputs translated addresses in accordance with received instruction addresses.

It is preferable that said modified instruction storage unit stores an additional instruction for program modification and further stores a branch instruction at the substitutive address, the branch instruction having as a branch target an address of the additional instruction. As a result, the program modification attended with an increase in the number of instructions can be realized in a simple structure.

The present invention is a method for program modification in a microprocessor provided with an instruction storage unit including a ROM for storing instructions composing a program to be processed and a modified instruction storage unit for storing a modified instruction for program modification, comprising the steps of: comparing an instruction address of an instruction stored in said ROM with a modifying address which is an address of an instruction to be modified; translating the instruction address into a substitutive address at which the modified instruction is stored in said modified instruction storage unit when the instruction address and the modifying address match with each other; and providing said instruction storage unit with the substitutive address instead of the instruction address.

According to the present invention, an instruction to be modified can be substituted by a modified instruction stored in the modified instruction storage unit by translating the address to be supplied to the instruction storage unit. Consequently, program modification can be achieved without the execution of unnecessary branch instructions or interrupt processes. Furthermore, contiguous address areas can be modified, so that program modification can be performed not only in units of one word but also in units of a block consisting of several words.

It is preferable that, before said address comparison, an additional instruction for program modification is stored to said modified instruction storage unit; and a branch instruction is stored at the substitutive address, the branch instruction having as a branch target an address of the additional instruction.

BRIEF DESCRIPTION OF THE DRAWINGS

FIG. 9 shows an example of correspondence relation between input addresses and output addresses for address translation.

DETAILED DESCRIPTION OF THE INVENTION

The embodiment of the present invention will be described as follows with reference to the drawings.

Figure 1:
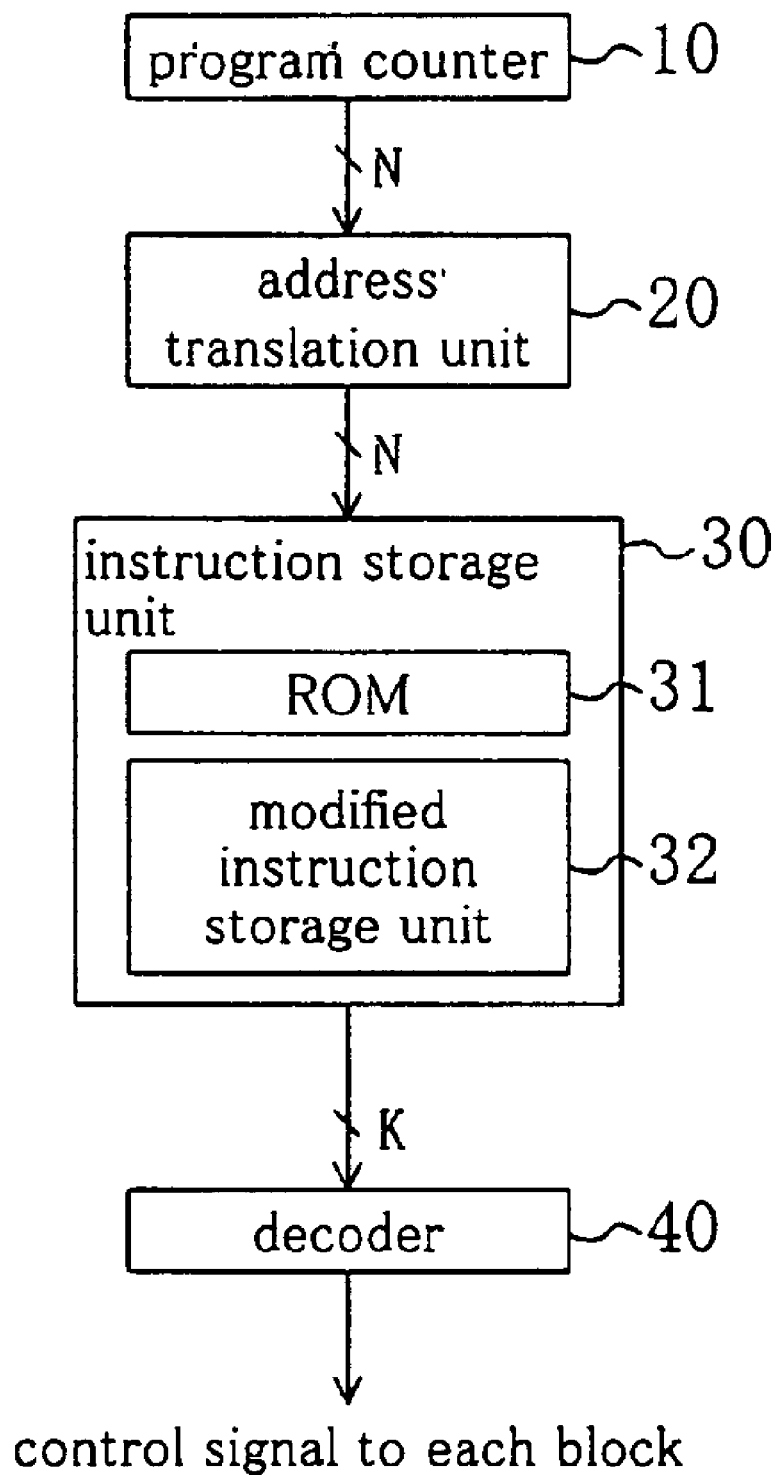
FIG. 1 shows the structure of the microprocessor with the program modification feature of the first embodiment of the present invention.

FIG. 1 shows the structure of the microprocessor with the program modification feature of the embodiment of the present invention. In the structure, the program counter 10 supplies an address translation unit 20 with an instruction address via an instruction address bus. The address translation unit 20 translates the received instruction address when it is necessary for program modification. An instruction storage unit 30 receives not the instruction address value outputted from the program counter 10 but the address value obtained by the translation in the address translation unit 20 in accordance with the program modification, and outputs the instruction data of the address value to the decoder 40.

The instruction storage unit 30 comprises a ROM 31 which stores instructions composing a program to be processed and a modified instruction storage unit 32 which stores modified instructions for program modification. The ROM 31 and the modified instruction storage unit 32 are both assigned an address space for the microprocessor to be accessible to. When the instruction address received matches with the modifying address which is an address of an instruction necessary to be modified, the address translation unit 20 translates the instruction address into a substitutive address at which the modified instruction is stored in the modified instruction storage unit 32.

Figure 2:
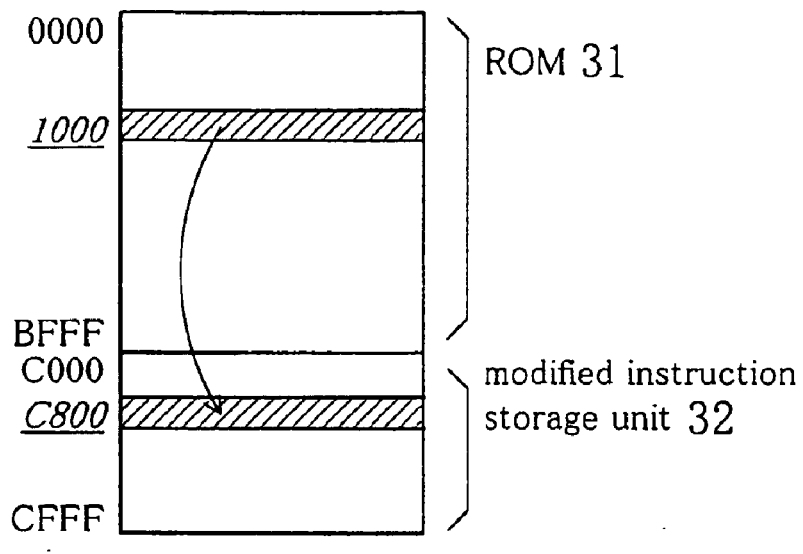
FIG. 2 shows an example of address translation of the first embodiment of the present invention.

FIG. 2 shows a memory map depicting the address space in the instruction storage unit 30 to show an example of the address translation of the present embodiment. In FIG. 2, the ROM 31 has a storage capacity of 48 kiloword mapped from address 0000 to address BFFF, whereas the modified instruction storage unit 32 has a storage capacity of 4 kiloword mapped from address C000 to address CFFF.

Assuming that the instruction stored at address 1000 in the ROM 31 has a bug, the modified instruction data is stored at the substitutive address (address C800 in FIG. 2) within the storage area of the modified instruction storage unit 32. Then, the address translation unit 20 is so set that the entered instruction address of address 1000 is translated into the substitutive address of address C800. When the program counter 10 outputs address 1000 as the instruction address during the execution of the program, the instruction storage unit 30 receives address C800 of the substitutive address instead of the address 1000 through the address translation in the address translation unit 20. The decoder 40 receives the instruction data stored in address C800. Thus, the instruction at address 1000 can be substituted by the instruction at address C800.

By this system, any instruction with an address in the ROM 31 can be substituted by the instruction data of a desired address in the modified instruction storage unit 32 to realize program modification. This instruction substitution does not require branch instructions or interrupts to spend useless machine cycles or to increase the number of dynamic steps.

Figure 3:
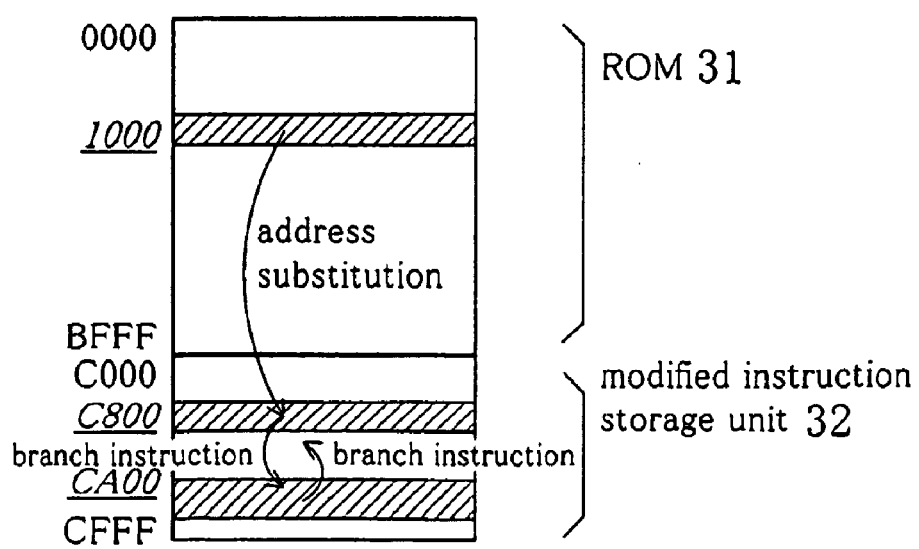
FIG. 3 shows another example of address translation of the first embodiment of the present invention.

FIG. 3 shows another example of the address translation of the present embodiment. In the modified instruction storage unit 32, a branch instruction is stored in the location indicated by the substitutive address or at address C800, whereas additional instructions for program modification are stored in the branch target of this branch instruction or at address CA00 and the subsequent addresses. As a result, program modification involving an increase in the number of instructions can be easily realized.

To be more specific, the modification of the instruction address 1000 to the substitutive address C800 makes the branch instruction at address C800 be executed. Then, the additional instructions stored at address CA00 of the branch target and the subsequent addresses are executed accordingly. The modified instruction storage unit 32 is assigned the address space for the microprocessor to be accessible to, so that the storage unit can be shared for instruction substitution and instruction addition, which achieves the program modification involving an increase in the number of instructions in a simple structure without providing an additional circuit.

The modified instruction storage unit 32 can be realized by either recordable memory such as RAM, EPROM, flash memory and FeRAM or read only memory (ROM). When the modified instruction storage unit 32 is composed of recordable memory, a desired program modification is possible after the fabrication of the microprocessor. When the unit 32 is composed of ROM, on the other hand, program modification preset during the fabrication only is possible. In this case, various program modifications can be set in advance to select one of them in accordance with the usage of the microprocessor.

Figure 4:
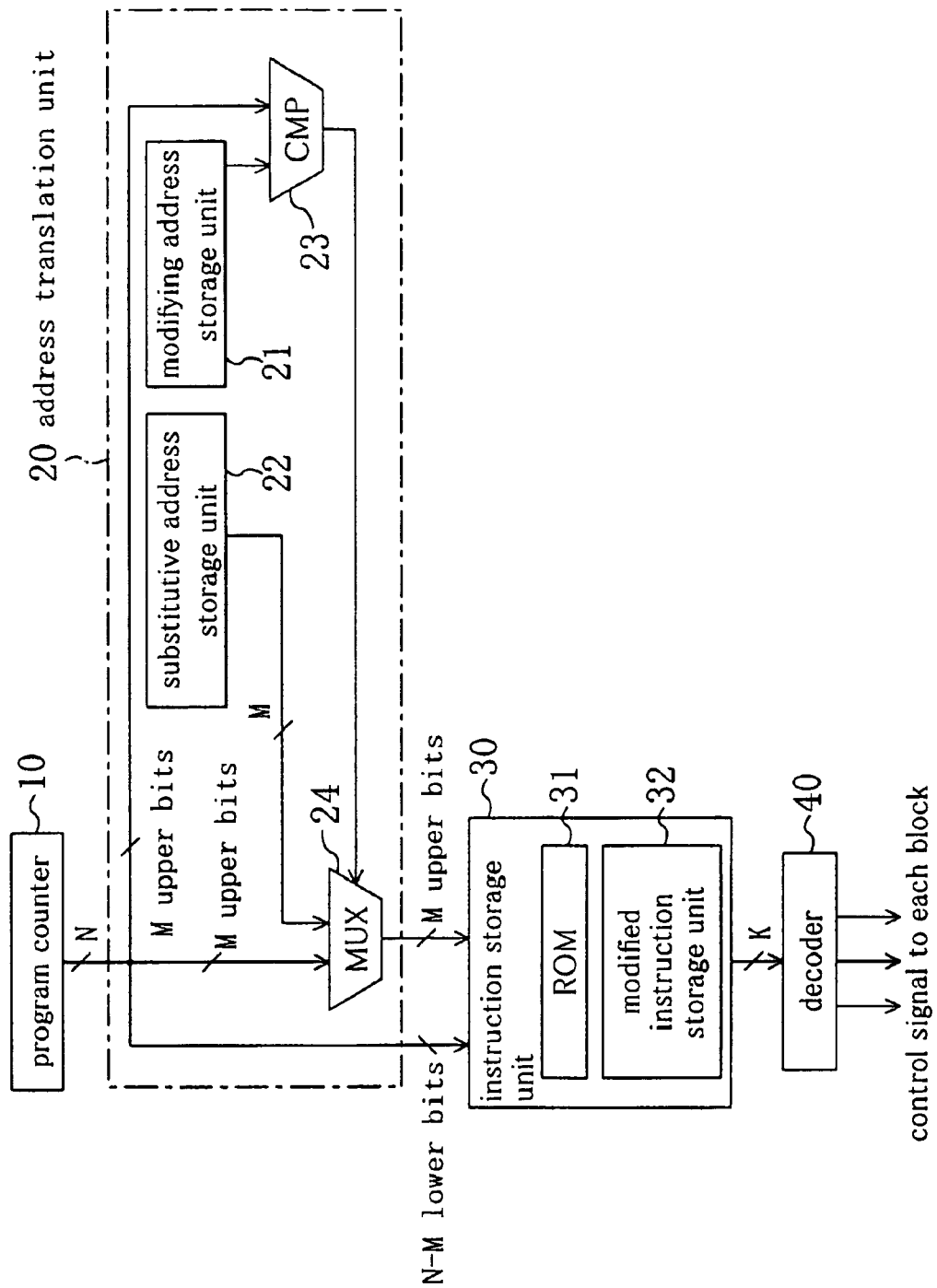
FIG. 4 shows an example of the specific structure of the address translation unit shown in FIG. 1.

FIG. 4 shows an example of the specific structure of the address translation unit 20, in which M upper bits of the instruction address are translated.

In the address translation unit 20, not all bits of the instruction address must be translated. When specific upper bits are exclusively translated, leaving the other bits untranslated, the bit width to be translated can be small to realize high-speed address translation and to speed up the readout operation of the instruction storage unit 30. For example, the translation from address 1000 to address C8000 is realized by the translation of only 5 upper bits of the 16-bit instruction address. The program modification in this case is carried out by using as a unit a 2-kiloword area represented by 11 lower bits.

In FIG. 4, a modifying address storage unit 21 holds the value of M upper bits as the predetermined bits of the modifying address indicating the address area to be modified, while a substitutive address storage unit 22 holds the value of M upper bits of the substitutive address indicating the address area of the substitutive target. An address comparator 23 compares the value of M upper bits of the instruction address outputted from the program counter 10 with the value held in the modifying address storage unit 21, determines whether or not these values match with each other, and outputs a signal indicating the determination results to an address selector 24.

When the signal from the address comparator 23 indicates the match between the bit values, or when the address comparator 23 determines the match between the bit values, the address selector 24 outputs the value held in the substitutive address storage unit 22 as the value of M upper bits of a new instruction address. On the other hand, when the signal from the address comparator 23 indicates the mismatch between the bit values, or when the address comparator 23 determines the mismatch between the bit values, the address selector 24 outputs the value of the M upper bits received from the program counter 10 as the value of M upper bits of a new instruction address.

(N-M) low order bits of the instruction address excluded from the address comparison are supplied from the program counter 10 directly to the instruction storage unit 30. The instruction storage unit 30 combines the M upper bits of the new instruction address outputted from the address selector 24 and the (N-M) low order bits of the instruction address outputted from the program counter 10 to produce a new instruction address, and outputs the instruction data of the new instruction address to the decoder 40.

Although it is not shown in FIG. 4, a rewrite pass for rewriting the stored bit values can be provided to the modifying address storage unit 21 and the substitutive address storage unit 22, so as to make stored bit values be rewritten before the execution of the program. Alternatively, the modifying address storage unit 21 and the substitutive address storage unit 22 can be structured to be rewritable during the execution of a program like a control register to which the microprocessor is accessible. This structure realizes modification of plural parts of a program with the single address comparator 23.

Although the upper bits of an instruction address are translated in the structure shown in FIG. 4, it goes without saying that all bits can be translated.

Figure 5:
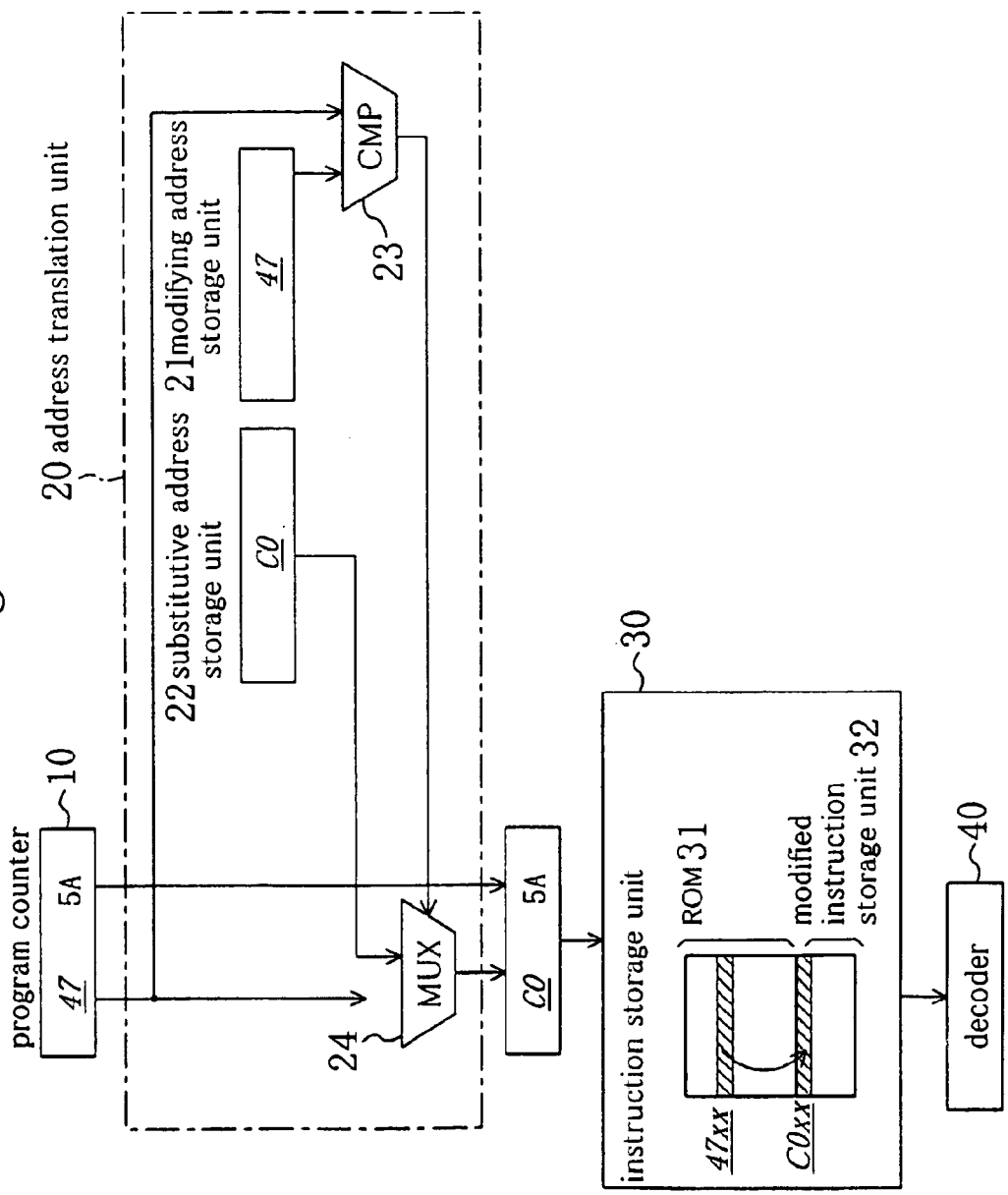
FIG. 5 shows an example of the behavior of the address translation unit shown in FIG. 4.

FIG. 5 shows an example of the behavior of the structure shown in FIG. 4. In this example, 8 upper bits of the 16-bit instruction address are predetermined for comparison and modification so as to substitute and modify the program stored in the ROM 31 every 256 word area. The ROM 31 has a storage capacity of 48 kiloword mapped from address 0000 to address BFFF, whereas the modified instruction storage unit 32 is RAM with a storage capacity of 4 kiloword mapped from address C000 to address CFFF.

In FIG. 5, assume that the program has a bug between address 4700 and address 47FF in the ROM 31. The 8 upper bits (namely "47") of the address with the bug are set in the modifying address storage unit 21. Then, 8 upper bits (namely "C0") of the substitutive address are set in the substitutive address storage unit 22 so that the area from address C000 to C0FF in the modified instruction storage unit 32 are used for program modification. Furthermore, instruction data which has been modified are written in the area between address C000 and address C0FF of the modified instruction storage unit 32.

When the program counter 10 outputs an instruction address from among addresses 4700 to 47FF during the execution of a program, the address comparator 23 supplies the address selector 24 with a signal indicating that the value of the 8 upper bits of this instruction address match with the value "47" stored in the modifying address storage unit 21. Upon receipt of this signal, the address selector 24 selects the value "C0" stored in the substitutive address storage unit 22 instead of the value "47" of the 8 upper bits of the instruction address supplied from the program counter 10, and outputs the selected value to the instruction storage unit 30.

Thus, as a result of accessing the instruction addresses from 4700 to 47FF, the substitutive addresses from C000 to C0FF are actually accessed to realize the program modification in 256 word. Since address C100 to address CFFF are not used, a branch instruction having a branch target in the area from address C100 to address CFFF can be described in the area from address C000 to address C0FF to achieve the addition and insertion of instructions without providing an additional circuit.

Figure 6:
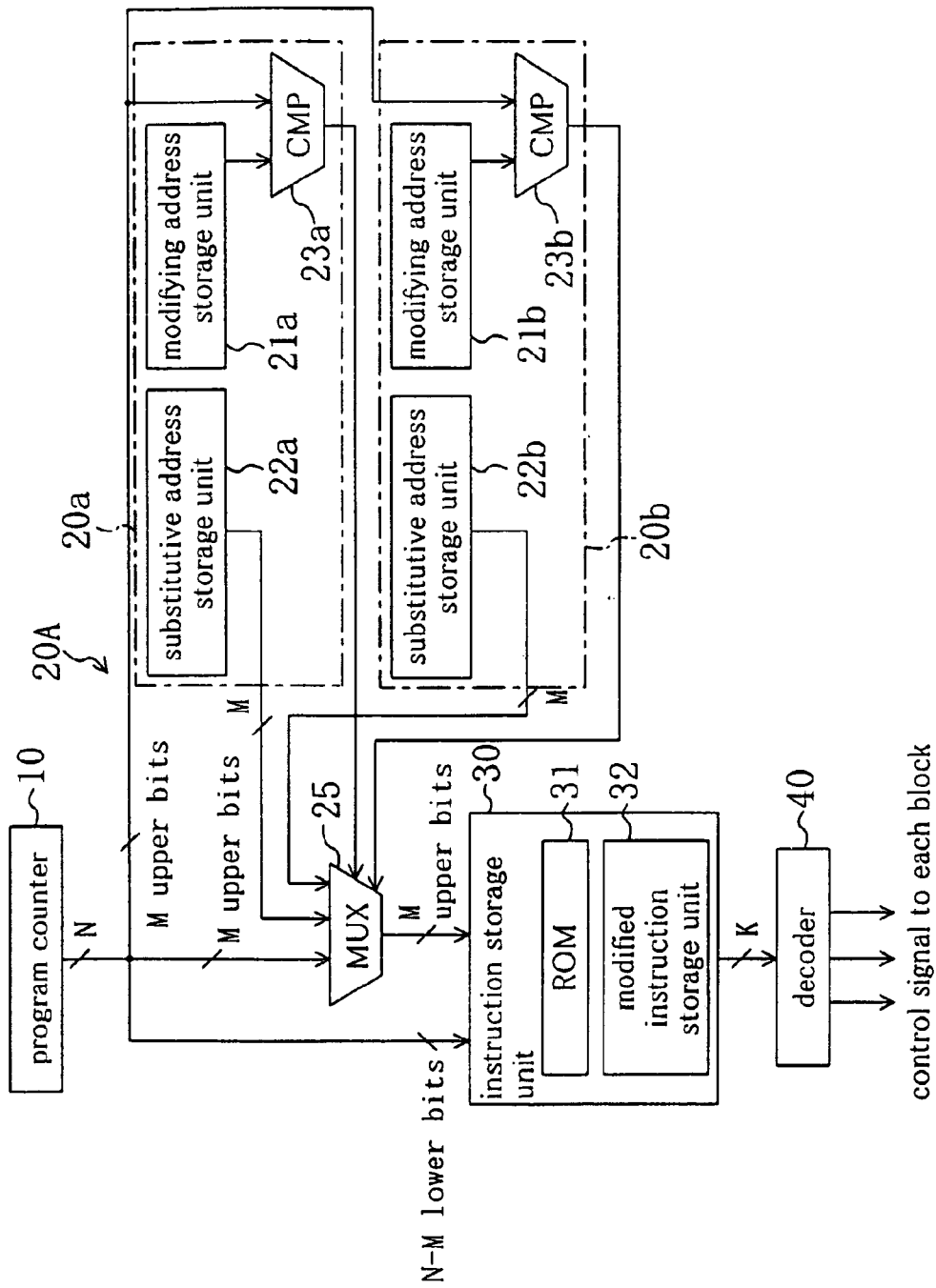
FIG. 6 shows another example of the structure of the address translation unit shown in FIG. 11.

FIG. 6 shows another example of the structure of the address translation unit. In the structure, the address translation unit 20A comprises two address translation units 20a and 20b for translating M upper bits of an instruction address. The first address translation unit 20a comprises a modifying address storage unit 21a, a substitutive address storage unit 22a and an address comparator 23a, whereas the second address translation unit 20b comprises a modifying address storage unit 21b, a substitutive address storage unit 22b and an address comparator 23b. An address selector 25 is shared by the first and second address translation units 20a, 20b. As shown in FIG. 6, providing plural address translation units realizes modification of plural parts in a sequence of a program.

In addition, the address translation units can be so structured that the bit width to be translated is changeable in translating the instruction address into the substitutive address.

Figure 7:
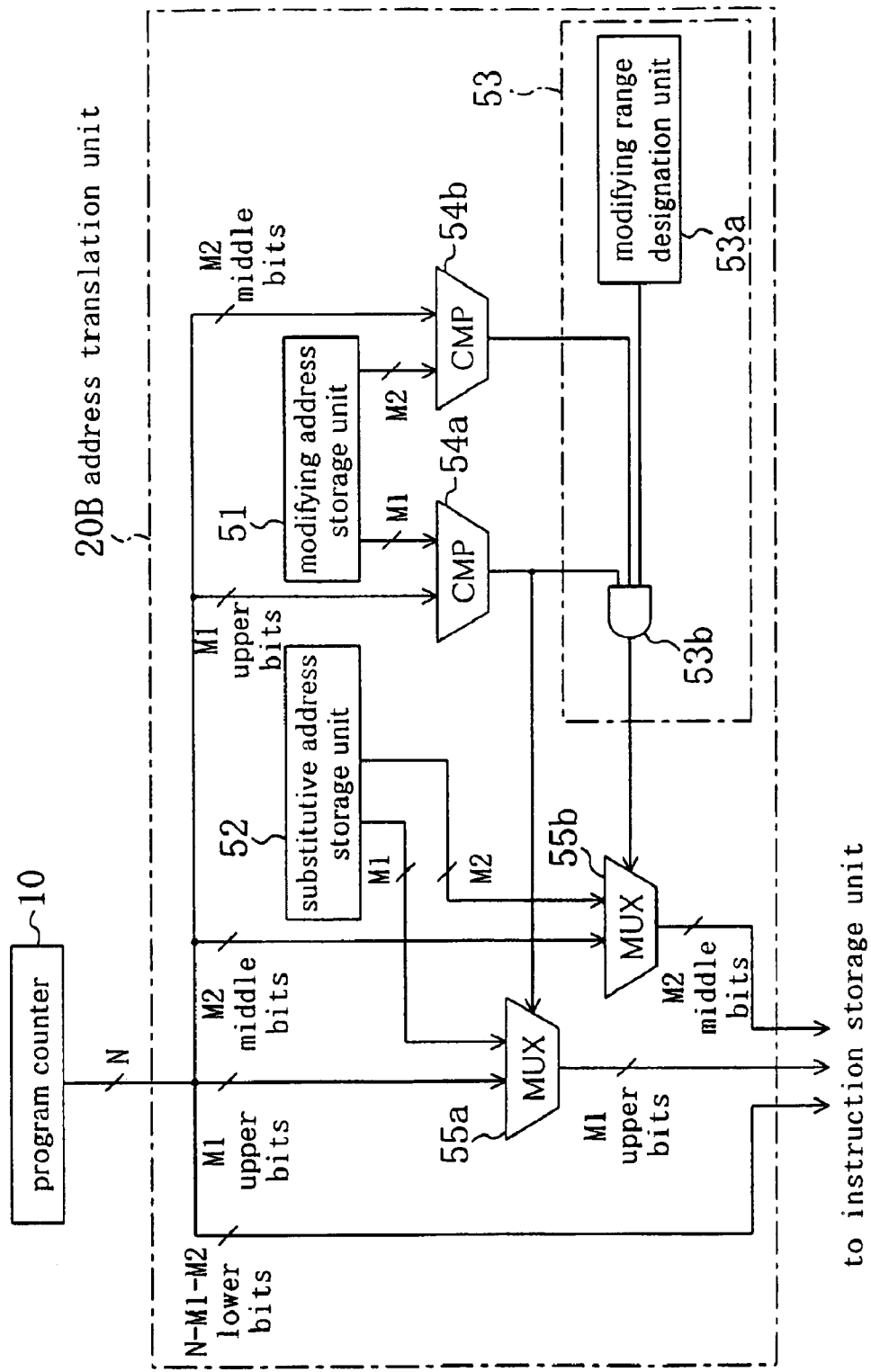
FIG. 7 shows an example of the structure of the address translation unit having a modifiable bit width for address translation.

FIG. 7 shows the structure of the address translation unit, where the bit width for address translation is changeable. The address translation unit 20B shown in FIG. 7 comprises two address comparators and two address selectors. The first address comparator 54a and the first address selector 55a perform address comparison and address translation of M1 upper bits, whereas the second address comparator 54b and the second address selector 55b perform address comparison and address translation of M2 middle bits. The modifying address storage unit 51 stores the M1 upper bits and the M2 middle bits of the modifying address, and supplies the M1 upper bits and the M2 middle bits to the first address comparator 54a and the second address comparator 54b, respectively. The substitutive address storage unit 52 stores M1 upper bits and M2 middle bits of the substitutive address, and supplies the M1 upper bits and the M2 middle bits to the first address selector 55a and the second address selector 55b, respectively.

A modifying range designation unit 53a holds and outputs "0" or "1". The bit width for address translation can be set and changed in accordance with the value held by the modifying range designation unit 53a. The modifying range designation unit 53a and a 3-input AND gate 53b compose translation range setting means 53.

When the modifying range designation unit 53a outputs "0" the 3-input AND gate 53b outputs "0" regardless of the value of the output signal of the second address comparator 54b, so that the second address selector 55b outputs the M2 middle bits of the instruction address supplied from the program counter 10 regardless of the determination results of the second address comparator 54b. Consequently, only the M1 upper bits of the instruction address supplied from the program counter 10 becomes the target of address translation.

On the other hand, when the modifying range designation unit 53a outputs "1", the second address selector 55b performs address translation of the M2 middle bits of the instruction address in accordance with the determination results of the first and second address comparators 54a, 54b. Consequently, (M1+M2) upper bits of the instruction address supplied from the program counter 10 become the target of the address translation.

In this manner, setting the storage value of the modifying range designation unit 53a makes it possible to set the bit width for address translation at two different values of the M1 upper bits and the (M1+M2) upper bits. To be more specific, the M2 middle bits are included in the bits to be translated when "1" is stored in the modifying range designation unit 53a, and is excluded from the bits when "0" is stored in the unit 53a. In other words, whether the M2 middle bits are designated as the bits to be translated or not can be set by the storage value of the modifying range designation unit 53a.

Therefore, providing the translation range setting means 53, the second address comparator 54b and the second address selector 55b more than one unit each can further increase the patterns for the bit width to be translated. Moreover, when the translation range setting means 53, the second address comparator 54b and the second address selector 55b shown in FIG. 7 are provided at each bit of the instruction address, any bit can be set as the translation target.

A reduction in the bit width to be the target of address translation achieves high-speed address translation and high-speed memory access. On the contrary, an increase in the bit width to be the target of address translation undesirably extends the time required for the address translation; however, less area is modified at one time, thereby making it possible to divide the modified instruction storage unit into more areas. Thus, the substitution of a bit width for another to be the target of address translation while a program is in execution realizes effective use of the storage capacity of the modified instruction storage unit, thereby improving the flexibility of program modification.

Figure 8:
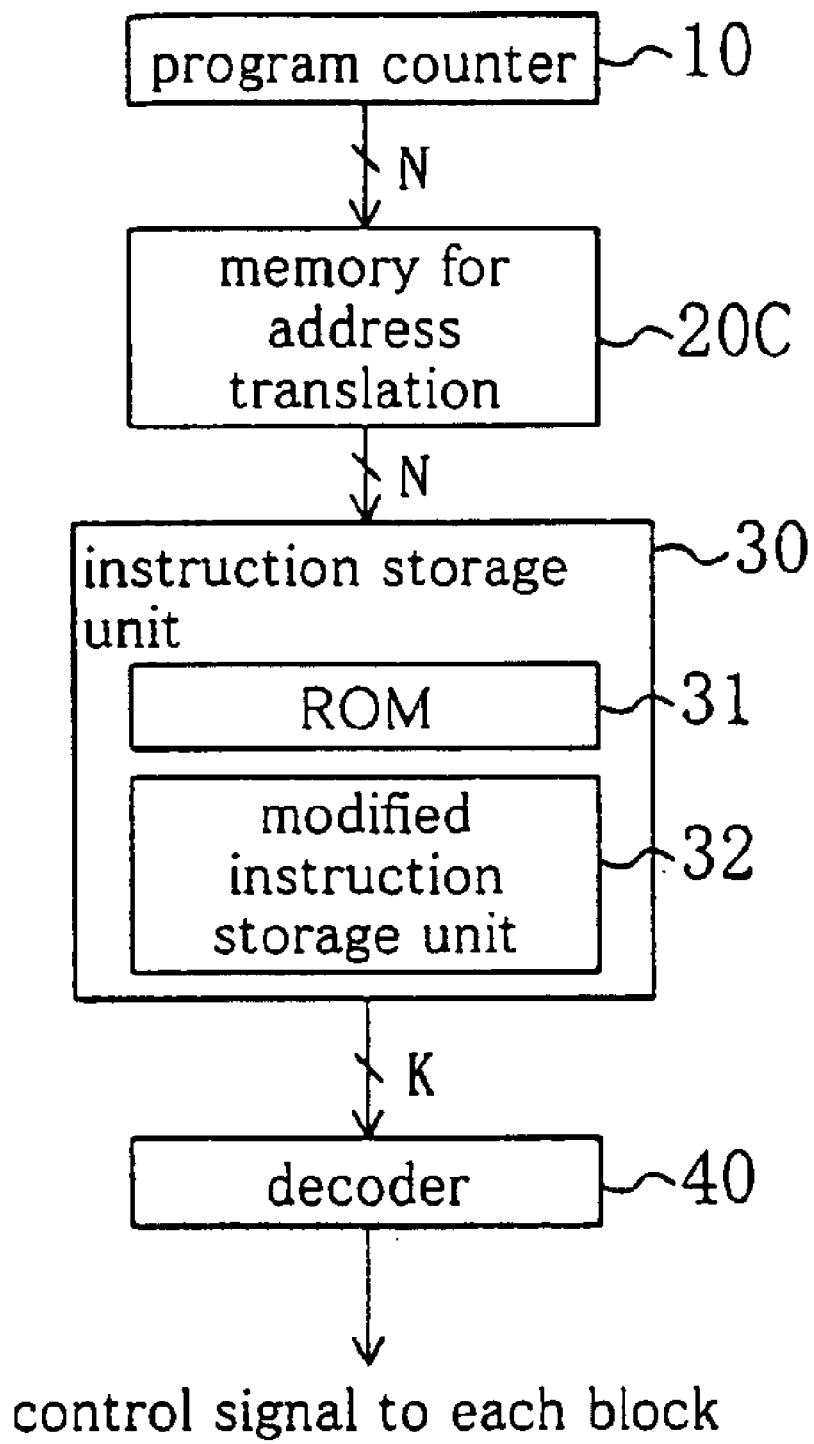
FIG. 8 shows the structure where the address translation unit is composed of memory.

As shown in FIG. 8, the address translation unit may be composed of a memory 20C for the address translation which outputs translation addresses in accordance with entered instruction addresses. The memory 20C for address translation may store the address correspondence like the one shown in FIG. 9. In FIG. 9, only 8 upper bits of the 16-bit address are the target of address translation; when the instruction address is 47XX, C0XX is outputted as the substitutive address. Thee lower bits are supplied directly to the instruction storage unit 30 without being translated. This brings about the simplification of the circuit and high-speed address translation. It goes without saying that all the bits in the address can be the target of translation.

Figure 10:
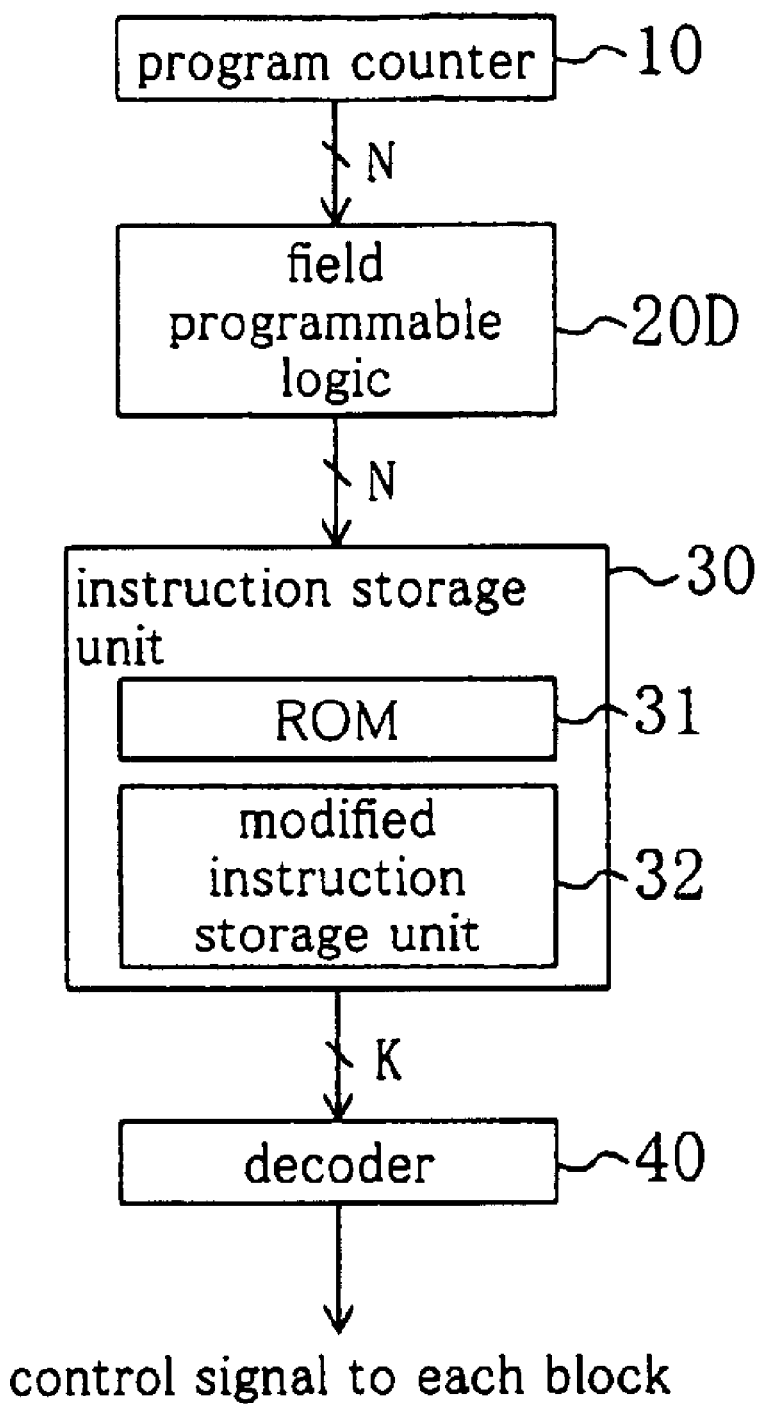
FIG. 10 shows the structure where the address translation unit is composed of a field programmable logic.
Figure 11:
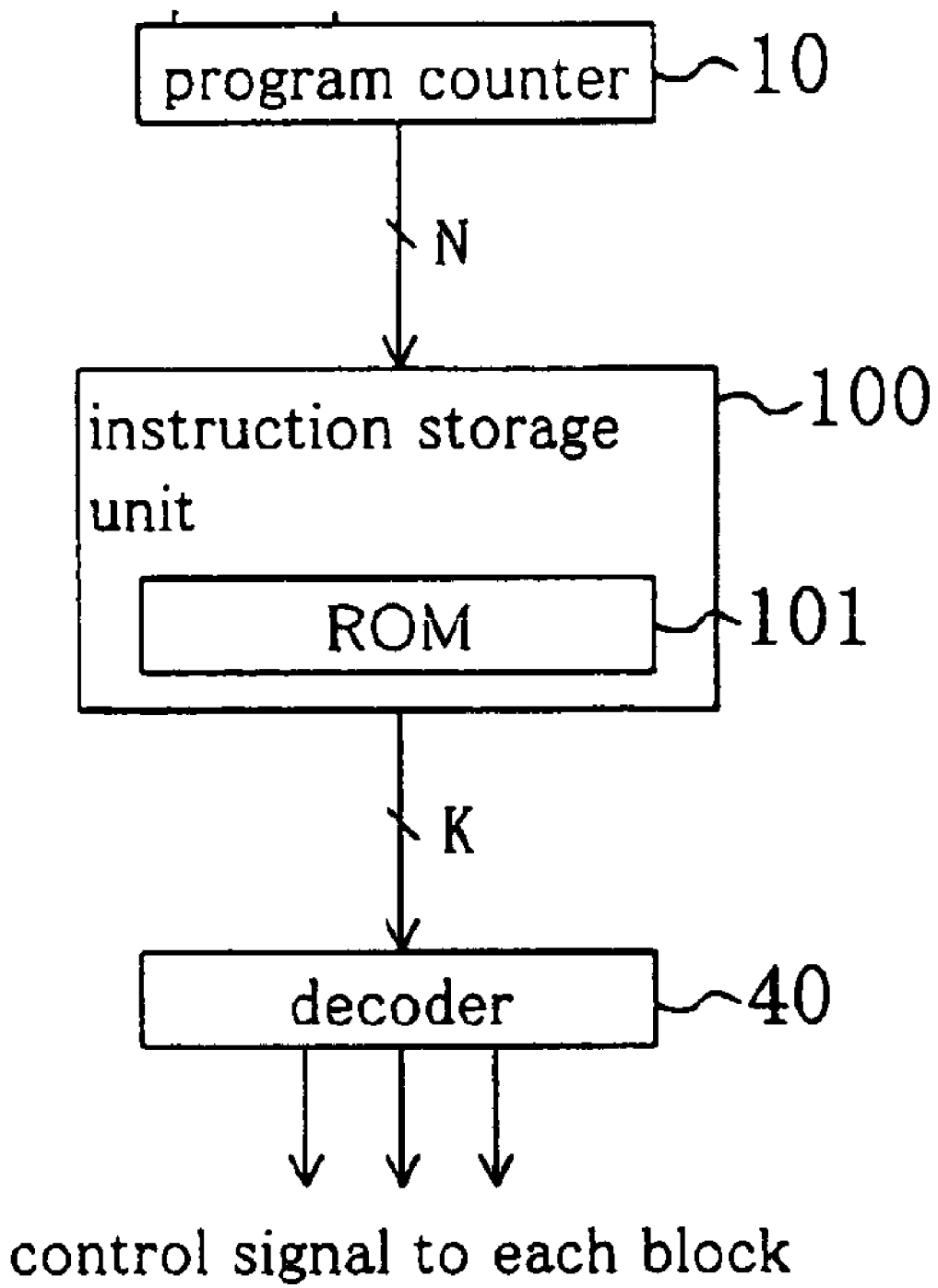
FIG. 11 shows a general structure of a microprocessor.
Figure 12:
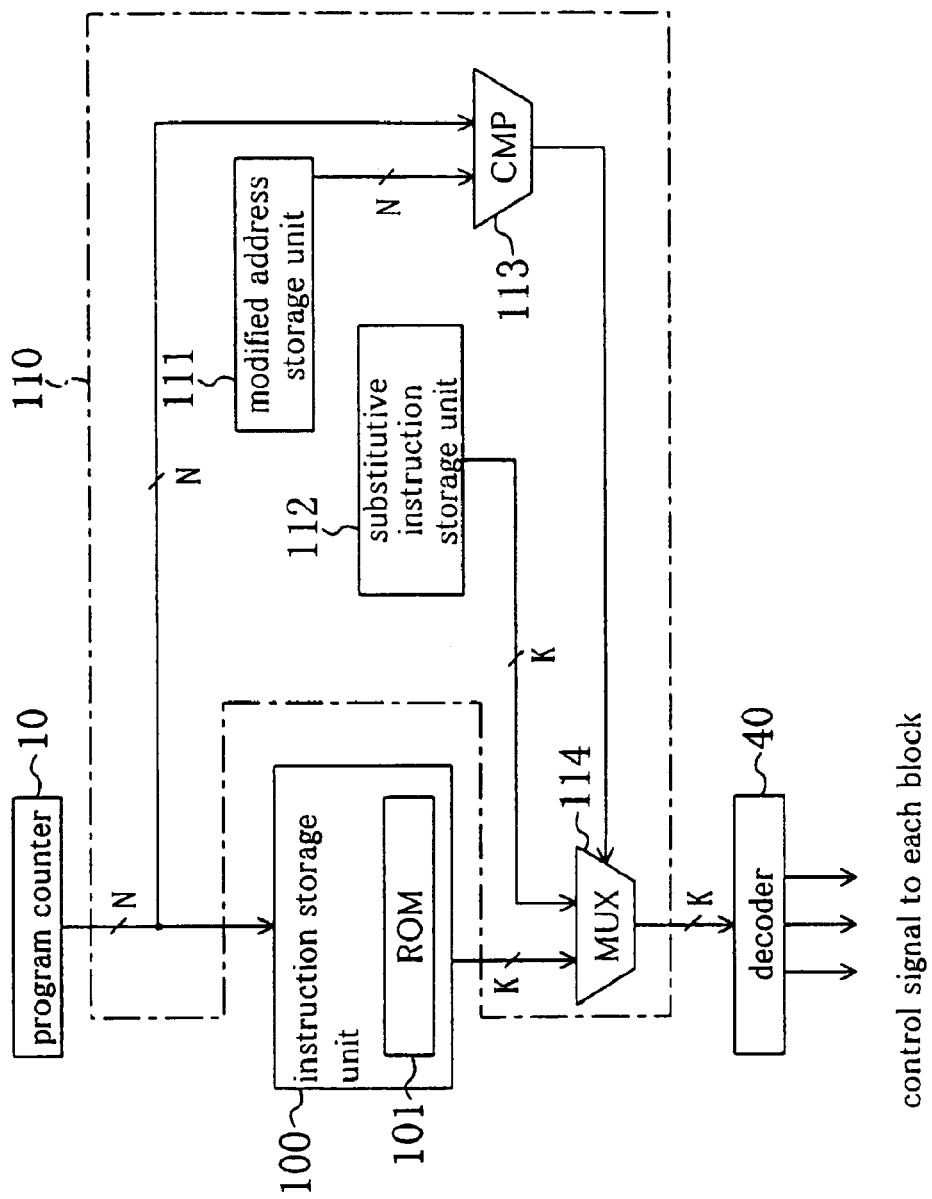
FIG. 12 shows the structure of a microprocessor with the conventional program modification feature.

As shown in FIG. 10, the address translation unit may be composed of the field programmable logic 20D which outputs translated addresses in accordance with entered instruction addresses. In this case, the address correspondence shown in FIG. 9 can be realized logically by the field programmable logic 20D.

As described hereinbefore, the present invention can achieve program modification without the execution of unnecessary branch instructions or interrupt processes. Furthermore, contiguous address areas can be modified. The program modification involving an increase in the number of instructions can be realized with a simple structure.

What is claimed is:

1. A microprocessor provided with a program modification function comprising:

an instruction storage unit including a read-only-memory (ROM) for storing instructions composing a program to be processed and a modified instruction storage unit for storing a modified instruction for program modification; and an address translation unit for receiving an instruction address of an instruction stored in said ROM and for translating the instruction address into a substitutive address at which the modified instruction is stored in said modified instruction storage unit when the instruction address matches with a modifying address which is an address of an instruction to be modified, said address translation unit outputting the substitutive address to said instruction storage unit instead of the instruction address, wherein said address translation unit is so composed that a bit width to be a translation target is changeable when the instruction address is translated into the substantive address, wherein said address translation unit comprises:

a modifying address storage unit for holding a value of a predetermined bit of the modifying address;

an address comparator for comparing a value of said predetermined bit of the instruction address with the value held in said modifying address storage unit to determine whether or not these values match with each other;

a substitutive address storage unit for holding a value of said predetermined bit of said substitutive address;

an address selector for receiving determination results of said address comparator, outputting as a value of said predetermined bit of a new instruction address, the value held in said substitutive address storage unit when the received results indicate that these values match with each other, and otherwise, the value of said predetermined bit of the instruction address; and a translation range setting means capable of setting whether or not said predetermined bit is designated as a translation target bit, said translation range setting means making said address selector output the value of said predetermined bit of the instruction address, regardless of the determination results of said address comparator when said predetermined bit is not designated as the translation target bit.

2. A microprocessor provided with a program modification function comprising:

an instruction storage unit including a read-only-memory (ROM) for storing instructions composing a program to be processed and a modified instruction storage unit for storing a modified instruction for program modification; and an address translation unit for receiving an instruction address of an instruction stored in said ROM and for translating the instruction address into a substitutive address at which the modified instruction is stored in said modified instruction storage unit when the instruction address matches with a modifying address which is an address of an instruction to be modified, said address translation unit outputting the substitutive address to said instruction storage unit instead of the instruction address, wherein, said address translation unit comprises:

a modifying address storage unit for holding a value of a predetermined bit of the modifying address;

an address comparator for comparing a value of said predetermined bit of the received instruction address with the value held in said modifying address storage unit to determine whether or not these values match with each other;

a substitutive address storage unit for holding a value of said predetermined bit of the substitutive address; and an address selector for receiving determination results of said address comparator, outputting as a value of said predetermined bit of a new instruction address, the value held in said substitutive address storage unit when the received results indicate that these values match with each other, and otherwise, the value of said predetermined bit of the instruction address.

* * * * *